UNITED STATES PATENT OFFICE.

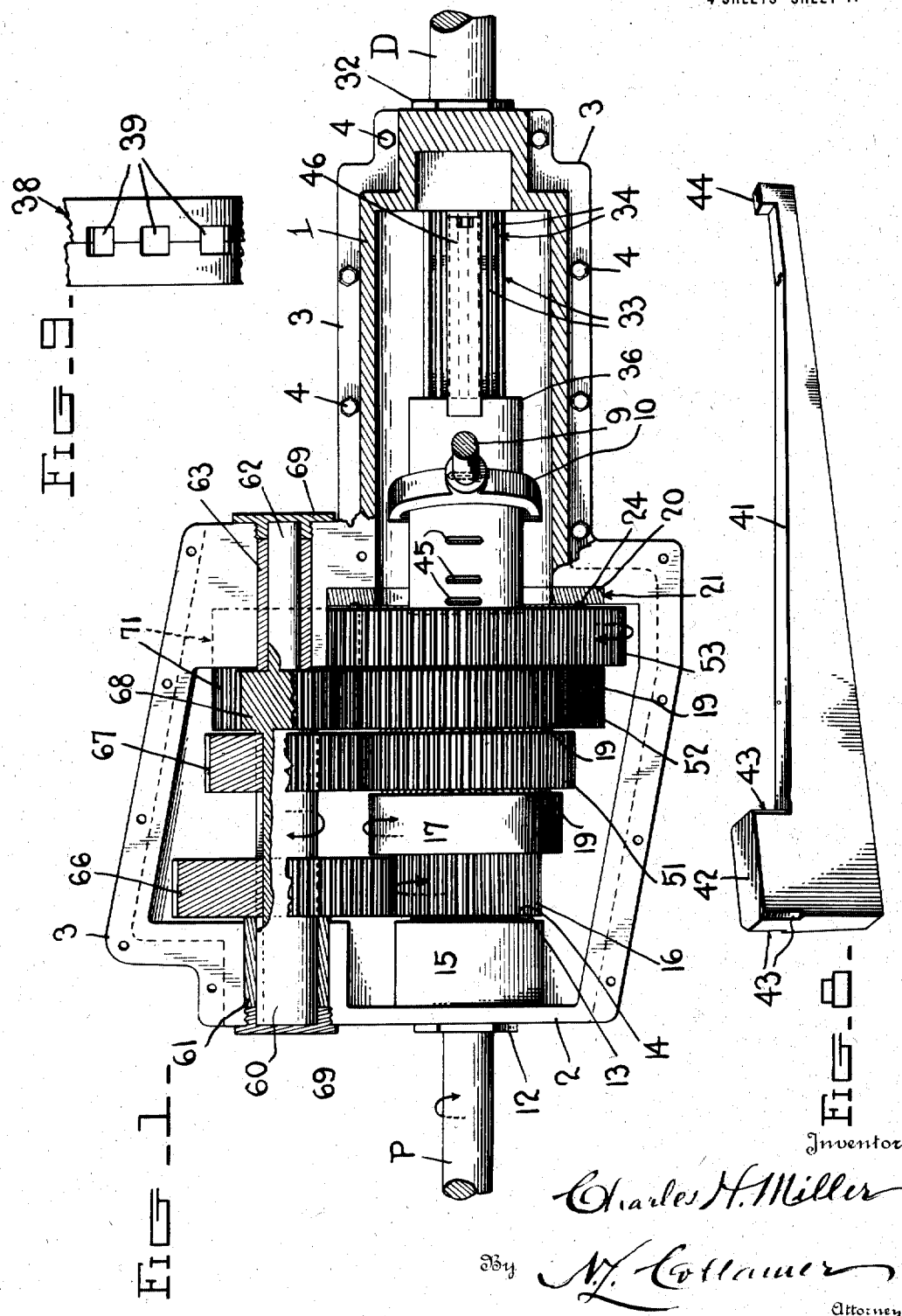

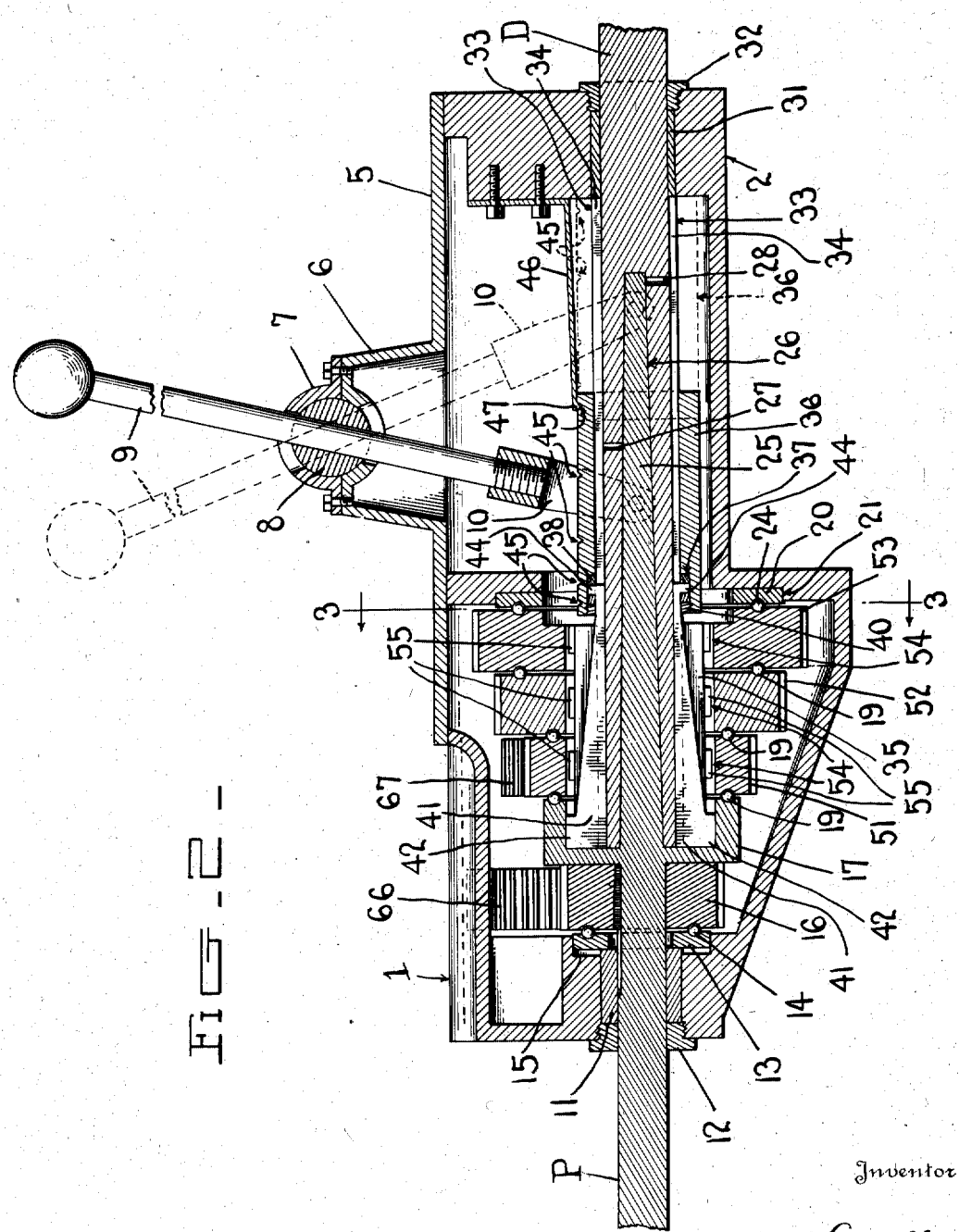

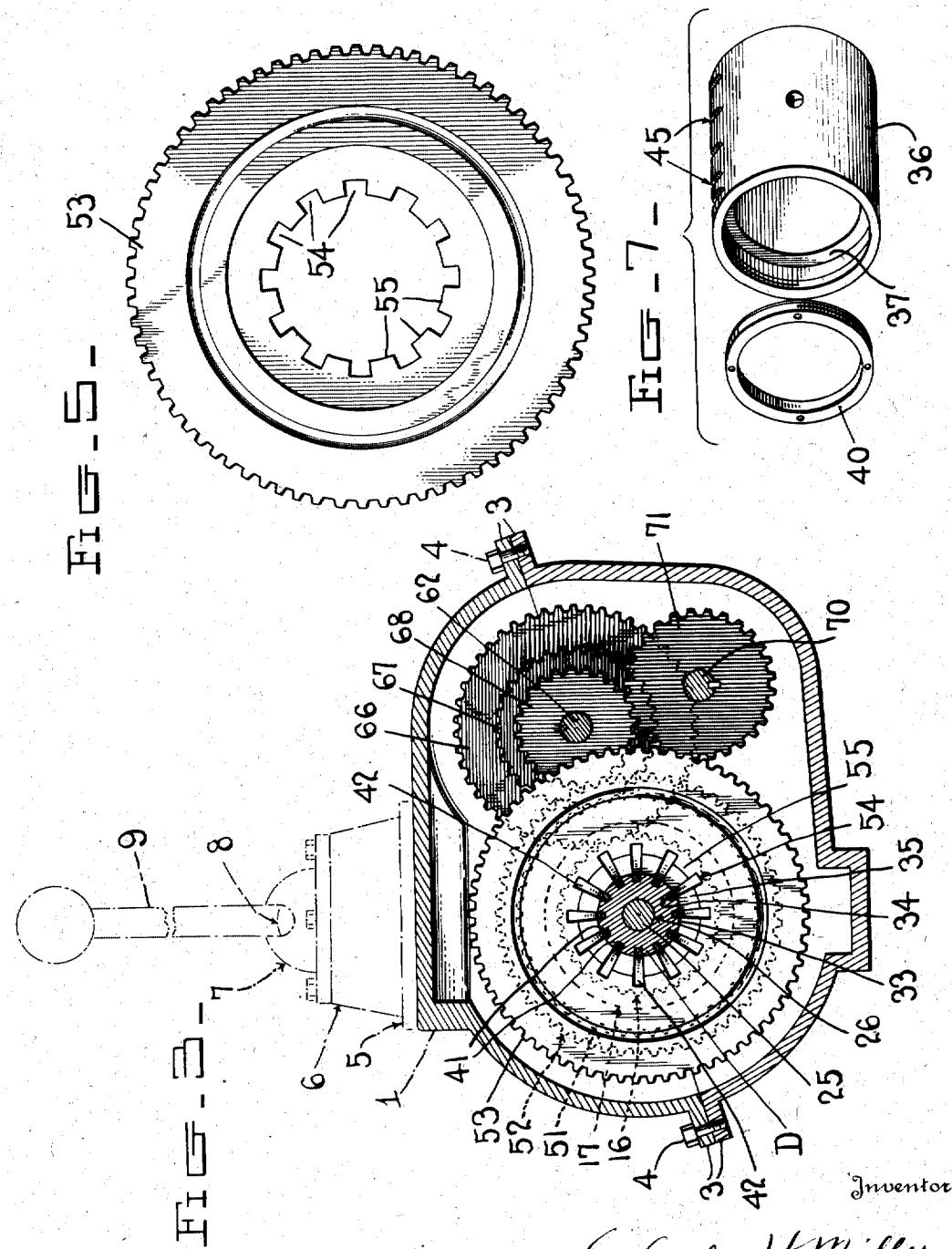

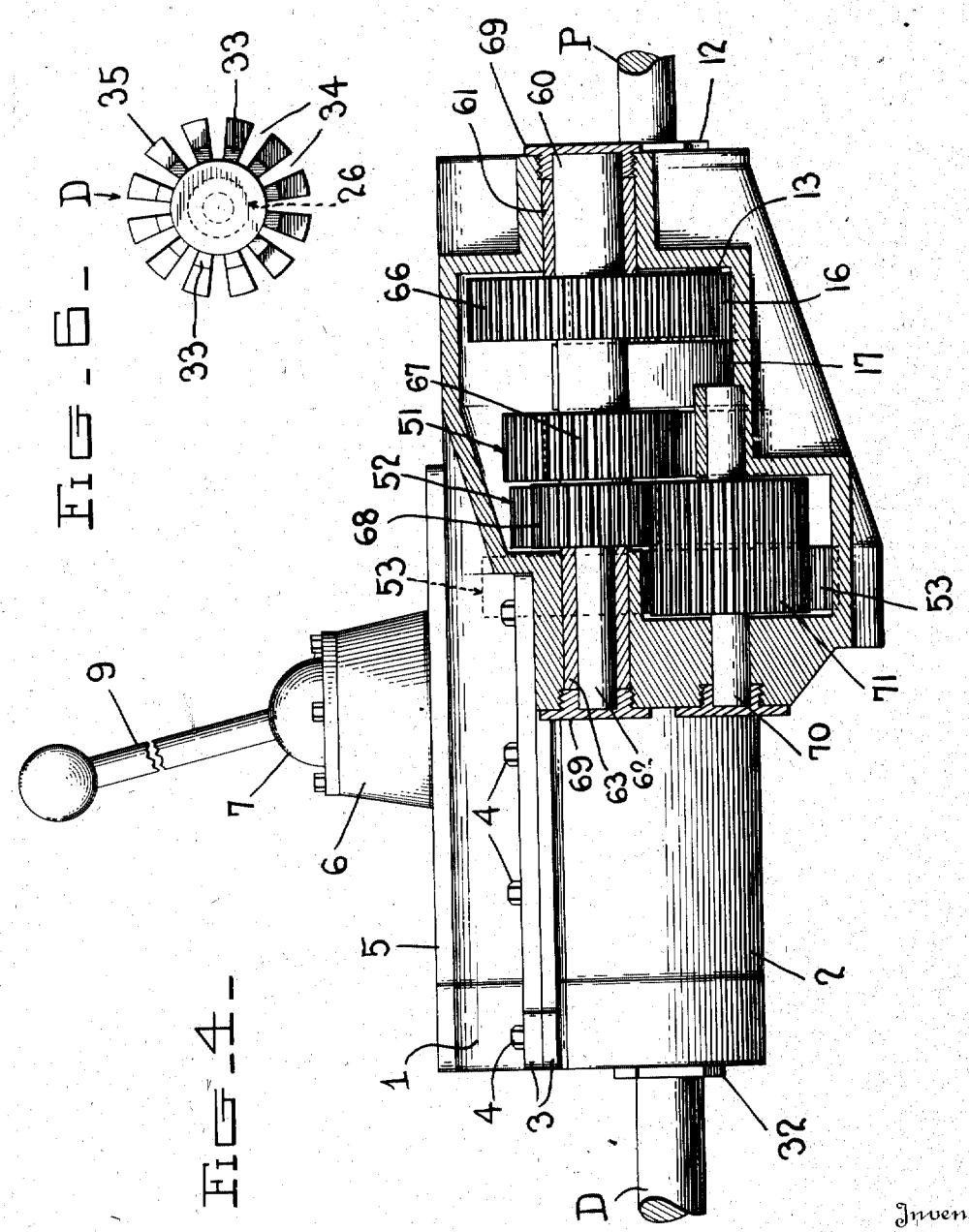

CHARLES H. MILLER, OF LIBERTYVILLE, IOWA.

TRANSMISSION MECHANISM.

1,278,975.  Specification of Letters Patent.  Patented Sept. 17, 1918.

Application filed June 2, 1917. Serial No. 172,368.

*To all whom it may concern:*

Be it known that I, CHARLES H. MILLER, a citizen of the United States, and resident of Libertyville, Jefferson county, State of Iowa, have invented certain new and useful Improvements in Transmission Mechanism; and my preferred manner of carrying out the invention is set forth in the following full, clear, and exact description, terminating with claims particularly specifying the novelty.

This invention relates to machine elements, and more particularly it is a transmission mechanism such as is used on motor vehicles between the power and driven shafts; and the object of the invention is to simplify and improve such a device while yet reducing its size and rendering its parts strong, few, and accessible.

Further objects will appear from the following specification wherein the preferred construction of the device is set forth, reference being had to the accompanying drawings wherein:

Figure 1 is a plan view with most of the upper half of the casing removed, and some of the parts broken away and in section.

Fig. 2 is a vertical longitudinal section through the power and driven shafts.

Fig. 3 is a cross section on the line 3—3 of Fig. 2.

Fig. 4 is a left side elevation, partly in section.

Fig. 5 is an enlarged elevation of the reverse gear.

Fig. 6 is a rear elevation of the driven shaft, partly in section.

Fig. 7 is a perspective detail of the shift sleeve and its ring.

Fig. 8 is a perspective detail of one key.

Fig. 9 is a detail of the two-part collar within the shift sleeve.

The casing is preferably made in upper and lower parts 1 and 2 having flanges 3 meeting at the sides and connected by screws or bolts 4, and the rear portion of the casing is closed by a top plate 5 from which rises a dome 6 having bearings 7 in which is mounted any suitable form of joint. The latter is herein shown as a ball 8 having a hole through which passes the shank of a hand lever 9 having a ball-shaped handle at its upper end and a fork 10 at its lower end. I will here state, however, that the manipulating mechanism shown is illustrative only of the simplest form of lever which occurs to me, and constitutes no part of the present invention. The power shaft P leads rearward from the clutch as usual, and the driven shaft D leads back to and is connected with the axle which is to be rotated at various speeds by this transmission mechanism, according as it is set. The casing will be supported in position where the lever rises to within reach of the driver's hand— possibly through a slot in the flooring as usual.

The power shaft passes through a bearing 11 in the front end of the casing which is held removably in place by a threaded bushing 12, thence loosely through a ring 13 having a ball race for balls 14 as shown, this ring being held movably within a pocket 15 in the casing so that it may be advanced by setting up the bushing 12, thence through the power gear 16 which is preferably keyed to the shaft and rests against the balls, thence through a cupped collar 17 preferably formed integral with the shaft and having its base resting against said gear, thence through a series of gears increasing progressively in size and separated from each other and from the collar by balls 19, and finally through a large ring 20 resting in a pocket 21 in the casing, and which ring has a race for balls 24 between it and the largest gear of said series. Thus the several gears and the collar interposed are held separated by the balls 19, and are held collectively between the two rings 13 and 20 and their balls 14 and 24 as between thrust bearings. The power shaft is continued rearward from the collar in a long and slightly tapering pin or tongue 25 adapted to fit and yet to turn within a correspondingly shaped axial socket 26 in the forward end of the driven shaft D, and holes 27 and 28 admit lubricant from the interior of the casing, and permit its escape from the socket in a manner which will be clear.

The driven shaft passes through a bearing 31 in the rear end of the casing, held removably in place by a threading bushing 32, and in the assembly of parts its socket 26 is slid over the tongue 25 until its front end contacts with the bottom of the cupped collar 17 as shown. Forward from a point just inside the bearing 31 this shaft is provided with a series of spaced longitudinal ribs 33 leaving interposed keyways 34, shown in Fig. 6 as twelve in number; and from a point about coincident with the large ring 20, these ribs are radially enlarged as at 35 and the keyways consequently deepened. The ribs and keyways taper inwardly, and the core of the shaft is therefore not weakened. Slidable longitudinally on the smaller ribs, but held against rotation with the shafts, is a shift sleeve 36 the front end of whose bore is enlarged and threaded back to an internal shoulder 37 (see Fig. 7) to receive a collar 38 such as shown in Fig. 9. This collar is preferably in two parts with registering notches in their meeting edges producing twelve holes 39 when the parts are assembled, and it is held removably in position in the front end of the sleeve 36 by a screw ring 40. The fork 10 of the lever is shown as having pins entering holes in the sides of the sleeve whereby the latter may be shifted back and forth but is prevented from rotating.

Slidably mounted in the several keyways are keys 41 having long bodies tapering to the rear as shown in Fig. 8 and also tapering toward their inner edges to closely fit the keyways. Each key has its front end outturned or enlarged into a head 42 preferably beveled off at its corners as shown at 43, and its rear end outturned into a tail or hook 44 adapted to enter one of the openings 39 in the collar 38; hence the movement of the shift sleeve by the lever slides the keys back and forth. Said sleeve is notched as at 45, and a spring finger 46 carried within the casing has an inturned tip 47 which springs successively into the notches as the sleeve is moved, and holds it frictionally in any position to which it is adjusted; but this detail might be omitted if other manipulating mechanism were used.

The gears in the series mentioned are numbered respectively 51, 52, and 53, the latter being largest and next the large ring 20 whereas the smallest gear 51 is larger than the collar 17 next which it stands. This collar and the gears are all internally toothed to provide keyways as seen at 54 in Fig. 5, and the keyways are twelve in number to accommodate the series of keys described above. But the internal teeth 55 in these four elements do not extend their full width (see Fig. 2) and there exist therefore three neutral spaces between the four rings of teeth. The heads 42 of the keys are of the proper length to be received in these neutral spaces while out of mesh with the respectively adjacent rings of teeth; therefore, during the sliding of the keys, they pass from engagement with one gear through a neutral space, and into engagement with the next gear, and so on as will be clear. When the keys are engaged with the collar 17 (which might be called the smallest gear for sake of simplicity), the mechanism is set at "high" and the drive is direct from the power shaft P to the driven shaft D; when engaged with gear 51, we have "medium" speed; gear 52 gives "low"; and gear 53 gives "reverse." It is obvious there could be additional gears for further speeds without departing from the idea.

The counter shaft 60 is offset to one side of the line of the main shafts. Its front end is mounted in a bearing 61, and its rear end 62 is reduced in size and mounted in a bearing 63. Its driven gear 66 meshes with the power gear 16, its next smaller gear 67 with the medium gear 51, and its smallest gear 68 with the low speed gear 52. Said gear 68 is shown in Fig. 1 as forged to this shaft, whereas the other gears are keyed thereon for ease of manufacture and strength of parts. The shaft 60 is reduced at 62 to permit the large reverse gear 53 to run freely past it. The bearings are held in place by threaded bushings 69. I may here state that all bearings might have balls or rollers without departing from the invention, and if so proper accommodations will be provided for them.

The idler shaft 70 as usual underlies the counter shaft. It is mounted in bearings as indicated, and it carries a long idle gear 71 in constant mesh with the smallest counter gear 68 and the reverse gear 53.

With the parts assembled, when the clutch is closed rotation is in the direction of the arrows in Fig. 1. With the keys forward as seen in Fig. 2, the device is set for "high" and the drive is direct. While the power gear 16 turns the counter shaft, and its gears turn the gears 51, 52, and 53 idly because they are not in connection with the driven shaft D. Movement of the lever-handle forward slides the shift sleeve rearward and this moves the keys, first out of engagement with the internal teeth within the collar (smallest gear) 17 then into the neutral space next it, and then into engagement with the internal teeth in the next gear 51; and, as the latter is revolving more slowly than the collar, the speed transmitted is "medium." The next shift changes the speed to "low," and the next to "reverse." The neutral position next "reverse" will be that in which the parts will ordinarily be left when the driver is absent from his machine, but there is a neutral position next every speed position and this I consider an advantage.

What I claim is:

1. In a transmission mechanism, the combination with alined power and driven shafts telescoped at their meeting ends, the driven shaft having ribs producing longitudinal keyways, a series of keys therein having heads, and means for sliding the keys to adjust them selectively; of a series of gears provided with internal teeth to be engaged by the key-heads and disposed to produce neutral spaces between the teeth in respective gears, the latter progressively increasing in size externally and, a cupped collar integral with the power shaft, a power gear keyed on such shaft next said collar, and a counter shaft and idler shaft with gears driven from the power gear and respectively driving said first-named gears at variable speeds, as described.

2. In a transmission mechanism, the combination with power and driven shafts, the latter having longitudinal keyways, a series of keys therein having heads, and means for adjusting the keys longitudinally; of a cupped collar fast on the power shaft, a series of gears next the collar and progressively increasing in size externally therefrom, the collar and gears being provided with internal teeth to be engaged by the key-heads and disposed to produce neutral spaces between the teeth in respective elements, a counter shaft and idler shaft with gears respectively driving those mentioned at variable speeds, and means for driving said shafts from the power shaft.

3. In a transmission mechanism, the combination with alined power and driven shafts mounted in bearings, a collar fast on the power shaft, a series of ring gears next the collar, bearings between these elements and at the remote end of the series, teeth within said elements, a key slidably mounted on the driven shaft and having a head adapted to be selectively engaged with such teeth or set in the spaces between, and means for adjusting the key; of counter and idler shafts driven from the power shaft, and gears thereon respectively driving those mentioned at variable speeds and one of them in reverse direction.

4. In a transmission mechanism, the combination with a casing having bearings, a power shaft extending through one bearing and having a power gear next adjacent thereto and a cupped collar next the gear, a driven shaft extending through the other bearing and having a longitudinal keyway, a key slidably mounted therein and having a short head, and means for setting the key; of a series of ring gears next the collar, short teeth within these gears and the collar, and means for driving the gears at variable speeds and one of them in reverse direction from said power gear.

5. In a transmission mechanism, the combination with a casing having alined bearings in its front and rear ends and bushings outside the bearings, a power shaft extending through the front bearing and having an integral cupped collar, a driven shaft extending through the rear bearing and having longitudinal ribs radially enlarged at the front end of the shaft, such front end telescoping the rear end of the power shaft, a series of keys mounted slidably between the ribs and having heads at their front ends projecting beyond the enlarged ribs radially, and means for setting the keys; of a series of ring gears encircling the enlarged ribs, said gears and collar having internal teeth adapted to be successively engaged by the heads of the keys as the latter are set, and means for driving the gears from the power shaft at variable speeds and one of them in reverse direction.

6. In a transmission mechanism, the combination with power and driven shafts the latter having longitudinal keyways, keys slidably mounted therein and having heads at one end and hooks at the other, a series of ring gears encircling said driven shaft and having internal teeth successively engaged by the heads as the keys are moved, and means for driving the gears from the power shaft at variable speeds and one of them in reverse direction; of a shift sleeve slidably surrounding the driven shaft and having notches, a collar within said sleeve having holes with which said hooks are engaged, means for setting the sleeve to adjust the keys, and a finger engaging said notches, for the purpose set forth.

In testimony whereof I have hereunto subscribed my signature this the 28th day of May, A. D. 1917.

CHARLES H. MILLER.